(12) United States Patent
Miller

(10) Patent No.: US 7,991,156 B1
(45) Date of Patent: Aug. 2, 2011

(54) DIGITAL RIGHTS MANAGEMENT NEGOTIATION FOR STREAMING MEDIA OVER A NETWORK

(75) Inventor: Eric Miller, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 651 days.

(21) Appl. No.: 12/107,406

(22) Filed: Apr. 22, 2008

Related U.S. Application Data

(62) Division of application No. 10/626,813, filed on Jul. 23, 2003, now Pat. No. 7,382,879.

(51) Int. Cl.
- *H04N 7/167* (2006.01)
- *G06F 7/04* (2006.01)
- *G06F 17/30* (2006.01)
- *G06F 15/16* (2006.01)
- *H04L 29/06* (2006.01)
- *G06Q 20/00* (2006.01)

(52) U.S. Cl. ............ 380/201; 726/30; 726/31; 713/163; 709/231; 705/80

(58) Field of Classification Search ............ 726/30, 726/31; 380/201

See application file for complete search history.

(56) References Cited

U.S. PATENT DOCUMENTS

| | | | |
|---|---|---|---|
| 6,094,485 A | 7/2000 | Weinstein et al. | |
| 6,944,776 B1 | 9/2005 | Lockhart et al. | |
| 7,006,528 B1 | 2/2006 | Kokkinen | |
| 7,089,594 B2 | 8/2006 | Lal et al. | |
| 7,421,411 B2 * | 9/2008 | Kontio et al. | 705/52 |
| 7,568,234 B2 * | 7/2009 | Naslund et al. | 726/26 |
| 7,845,014 B2 * | 11/2010 | Siegel | 726/29 |
| 2002/0082939 A1 | 6/2002 | Clark et al. | |
| 2003/0103528 A1 * | 6/2003 | Kawaguchi et al. | 370/468 |
| 2003/0126086 A1 * | 7/2003 | Safadi | 705/51 |
| 2003/0131353 A1 * | 7/2003 | Blom et al. | 725/25 |
| 2004/0043756 A1 | 3/2004 | Haukka et al. | |

(Continued)

FOREIGN PATENT DOCUMENTS

WO 00/62189 10/2000

OTHER PUBLICATIONS

F. Anderson, Cisco Systems, SDP Simple Capability Declaration, Oct. 2002, pp. 1-10.

J. Rosenberg et al., An Offer/Answer Model with SDP, Feb. 27, 2002, pp. 1-25.

IBM, The electronic Media Management System from IBM—The Complete Solution for Digital Rights Management, 2002.

(Continued)

*Primary Examiner* — Taghi T Arani
*Assistant Examiner* — Morshed Mehedi

(57) ABSTRACT

A digital rights management (DRM) method is negotiated prior to initiating delivery of a DRM encoded content item over a digital network between a client and a target server. The client identifies a link to the target server for accessing the DRM encoded content item. The client initiates a network session with the target server. The client sends an offer message to the target server containing a list of at least one supported DRM method. The target server sends an answer message to the client containing a corresponding list 1) indicating whether each DRM method listed in the to offer message is supported by the target server, and 2) providing a network address of a DRM license server for each supported DRM method. The client selects a supported DRM method. The client obtains a DRM license using the network address listed for the selected DRM method. The target server delivers the DRM encoded content item to the client using the selected DRM method.

10 Claims, 8 Drawing Sheets

U.S. PATENT DOCUMENTS

2004/0049694 A1* 3/2004 Candelore .................... 713/200
2004/0125757 A1* 7/2004 Mela et al. .................... 370/261
2004/0133632 A1* 7/2004 Messerges et al. ........... 709/203
2004/0205333 A1* 10/2004 Bjorkengren ................ 713/153
2004/0230806 A1 11/2004 Lisanke
2005/0044016 A1 2/2005 Irwin et al.

OTHER PUBLICATIONS

Delgado et al., "An Architecture for Negotiation with Mobile Agents", Oct. 2002, Universitat Pompeu Fabra (UPF), Barcelona, Spain, pp. 1-12.

* cited by examiner

DIGITAL RIGHTS MANAGEMENT NEGOTIATION FOR STREAMING MEDIA OVER A NETWORK

CROSS REFERENCE TO RELATED APPLICATIONS

This application is a division of co-pending application Ser. No. 10/626,813, filed Jul. 23, 2003, now U.S. Pat. No. 7,382,879, issued Jun. 3, 2008.

STATEMENT REGARDING FEDERALLY SPONSORED RESEARCH

Not Applicable.

BACKGROUND OF THE INVENTION

The present invention relates in general to distribution of protected (e.g., licensed) digital content over computer networks such as the Internet, and, more specifically, to making content items available via multiple digital rights management (DRM) systems and methods and to selection of a compatible DRM method for distributing content items from a target server to a client.

When distributing digital, electronic media files that contain copyrighted material, it becomes difficult or impossible to prevent files from being retransmitted and shared among large numbers of users, which thereby threatens the rights of artists and copyright owners. Digital rights management technologies are used to restrict the ability to open (e.g., listen to or view) media files to those who obtain a valid DRM license. Protected files are encrypted prior to distribution using an encryption key and are typically packaged with a key identifier and a network address of a DRM license server where a valid license can be obtained (e.g., by payment of a license fee). The granted license includes a decryption key and may also include various rules or limitations pursuant to which the file can be accessed (e.g., a fixed subscription period or a fixed number of playbacks of the media file).

A variety of DRM systems or methods have been introduced by different developers of DRM technology. Each DRM method has its own unique protocols, signaling methods, encryption algorithms, and media player requirements. The various DRM methods are not compatible with one another, so that unique software applications are required to be installed on the personal computers of the users accessing any particular media files protected by a particular DRM method. One such method is Microsoft® Windows Media® DRM system which uses the Windows Media® Rights Manager and the Windows Media® Player (currently at version 9.0). Another method is the Electronic Media Management System (EMMS) from International Business Machines Corporation. Many content providers of DRM encoded content have adopted proprietary DRM methods requiring proprietary software applications in order to access their content.

Because of the multitude of incompatible DRM methods, a user may be required to install many software applications on their personal computer in order to access content from various content providers. However, many users find it undesirable to install and configure large numbers of similar applications on their computer. Because of the lack of a standardized DRM method, widespread adoption of digital media distribution using DRM technology has been impeded.

SUMMARY OF THE INVENTION

The present invention utilizes DRM content servers capable of providing DRM encoded content items according to a plurality of DRM methods. When a client contacts a DRM content server, a most preferred DRM method supported by both the client and the server is negotiated for delivery of the DRM encoded content item (e.g., by streaming of a media file). Thus, the invention has the advantage of adapting file delivery to a DRM method preferred by a user, thereby avoiding the necessity of loading a multitude of DRM software applications on the user's computer.

In one aspect of the invention, a method is provided for initiating delivery of a digital rights management (DRM) encoded content item over a digital network between a client and a target server. The client identifies a link to the target server for accessing the DRM encoded content item. The client initiates a network session with the target server. The client sends an offer message to the target server containing a list of at least one supported DRM method. The target server sends an answer message to the client containing a corresponding list 1) indicating whether each DRM method listed in the offer message is supported by the target server, and 2) providing a network address of a DRM license server for each supported DRM method. The client selects a supported DRM method. The client obtains a DRM license using the network address listed for the selected DRM method. The target server delivers the DRM encoded content item to the client using the selected DRM method.

DETAILED DESCRIPTION OF PREFERRED EMBODIMENTS

Figure 1:
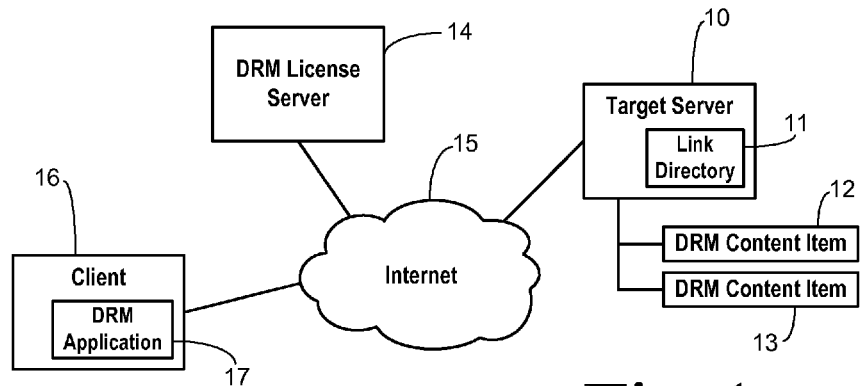
FIG. 1 is a block diagram showing a system for distributing DRM protected media files over an internetwork.

Referring to FIG. 1, a target server 10 includes a link directory 11 for pointing to a plurality of DRM encoded content items, including items 12 and 13. The content items may include digital music files in a music distribution system or digital video files in a video distribution system, for example. The content items may also be comprised of recorded voice mail messages in an IP telephony system as will be described later. Target server 10 preferably supports a plurality of DRM methods. Consequently, the content items may include multiple files containing the same media content that are encoded differently according to separate DRM methods.

Target server 10 is coupled to a DRM license server 14 via Internet 15 so that licensing information (e.g., decryption key, license rules, and license qualifications) can be transferred to DRM license server 14 when content items are added to target server 10. A client 16 (e.g., a user's personal computer) is connected to Internet 15 for communicating with target server 10 and DRM license server 14. Client 16 includes at least one DRM application 17 for accessing the DRM encoded content items. Preferably, content items are delivered from target server 10 to DRM application 17 by streaming of the corresponding media files.

Depending upon the specific DRM method used for any particular media file, each DRM content item is encrypted using a specific key seed and then packaged with a key identifier and the location of a DRM license server so that a client's DRM application can contact the license server and present the key identifier. After the client qualifies for a license, the license server sends a license containing the appropriate decryption key to allow the client to access the DRM encoded content item. Successful procurement of a license and the ability to decrypt and play a media file depend upon the client having a DRM application that is compatible with the DRM method used by target server 10 and DRM license server 14 for the DRM encoded content item being accessed. The present invention provides for the negotiation of a DRM method between client 16 and target server 10 in order to adopt a most preferred DRM method that is supported by both client 16 and target server 10.

Figure 2:
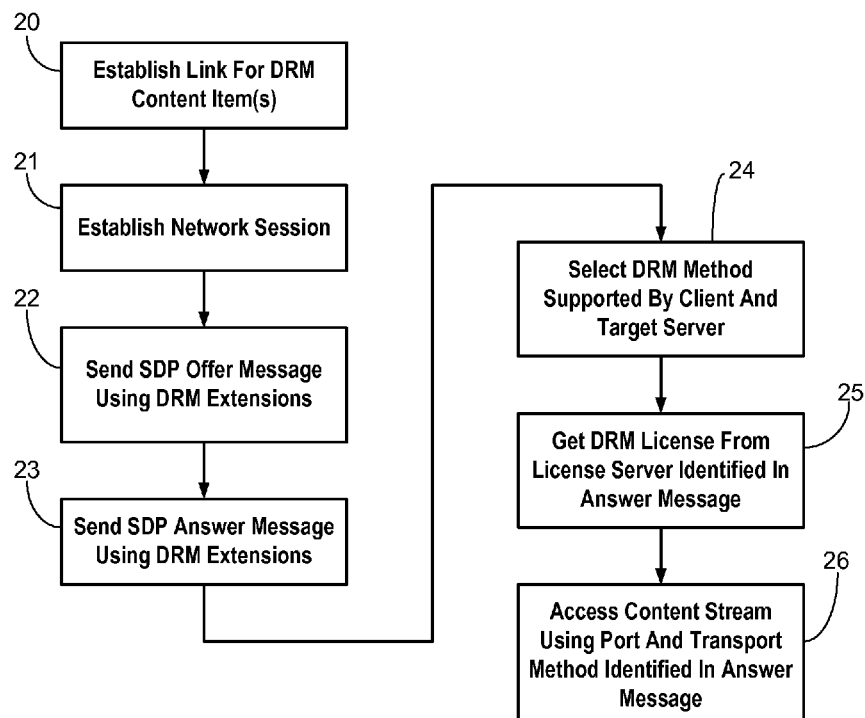
FIG. 2 is a flowchart showing one preferred embodiment of the invention.

Referring to the method of FIG. 2, a link for at least one DRM encoded content item is established in step 20. Establishment of a link may include setting up a network address within the target server for accessing the content item, as well as the advertising of that network address to specific users (e.g., via e-mail) or to users in general (e.g., via an HTML web page listing media files that are available for streaming). Using the link information, a client may establish a network session with the target server in step 21. In order to set up the appropriate parameters for the streaming of a media file, offer and answer messages are exchanged pursuant to the session description protocol (SDP), for example. Such offer and answer messages have conventionally been used to negotiate a stream type and codecs to be used for a stream. In step 22, the client sends an SDP offer message including DRM extensions for listing the DRM methods that are supported by the client. In step 23, the target server inspects the offer message and replies to the client with an answer message using the DRM extensions in order to indicate whether each DRM method specified in the offer message is supported or not.

In step 24, the client selects a DRM method supported by it and the target server for accessing the desired content item. The client contacts the appropriate license server identified in the answer message for the chosen DRM method in order to obtain a DRM license in step 25. In step 26, the client receives the content item streaming file from the target server using a port and transport method that are identified in the answer message for the chosen DRM method.

In one preferred embodiment, the present invention provides DRM extensions used when a client's DRM application, such as a media player, contacts a streaming media server to negotiate DRM parameters via respective SIP clients, for example. A DRM attribute is provided to allow an offerer to tell an answerer which DRM methods it can support. Likewise, a corresponding DRM attribute in an answer message tells the offerer which DRM methods the answerer can support. The format for a DRM attribute is:

a=drm:<drm type><address><port><transport>

The "type" field denotes the IANA reserved DRM type name (or any other agreed upon identifier for respective DRM methods). The "address" field is the network address of the DRM license server to be used with this DRM method. Port is the port used to access the DRM server application (i.e., the stream using the specified DRM method). Transport is the transport method used to exchange DRM data via the specified port.

Each DRM offer must have a corresponding DRM answer. If the answerer does not support a particular DRM offer, the answerer returns a value of zero for the attribute fields. Each offer is preferably in order of preferred acceptance. The offer must use an address of 0 and a port of 0 so that the answerer does not try to connect to the offerer. Typically, the client selects the first listed DRM method in the answer message for which the attribute fields are not zero (since the DRM methods are listed in order of preference). However, any supported method could be selected, such as when a second type of media file is selected for streaming during the same network session.

An example of a DRM offer/answer is given below.
SDP Offer
v=0
o=alice 1234567890 1234567891 IN IP4 computer.somedomain.com
s=
c=IN IP4 computer.somedomain.com
t=0 0
a=drm:opendrm 0 0 HTTP/TLS
a=drm:fastdrm 0 0 HTTP/TLS
a=drm:fastdrm 0 0 LDAP/SSL
m=audio 45000 RTP/AVP 0
a=rtpmap:0 PCMU/8000
a=receiveonly
SDP Answer
v=0
o=voicemail 1234567895 1234567896 IN IP4 computer2.someotherdomain.com
S=
c=IN IP4 computer2.someotherdomain.com
t=0 0
a=drm:0 0 0 0
a=drm:fastdrm license.someotherdomain.com 80 HTTP/TLS
a=drm:fastdrm license.someotherdomain.com 636 LDAP/SSL
m=audio 43000 RTP/AVP 0
a=rtpmap:0 PCMU/8000
a=sendonly The DRM types "opendrm" and "fastdrm" are examples only, since no generally recognized DRM type names have yet been established.

The foregoing negotiation of a DRM method can be used to set up the distribution of any type of DRM protected content files. In addition to applications in distributing commercial music and video content, the invention can be used in connection with a service for providing voice messages in an IP telephony system as described below and in copending U.S. application Ser. No. 10/626,786, entitled "System for Securing Messages Recorded in an IP Telephony Network," filed concurrently herewith, now U.S. Pat. No. 7,142,648, issued Nov. 28, 2006.

A Secure SIP Media Server (SSMS) for a voice message service provides for the recording and distribution of stored audio and video messages or other content to while maintaining the ability of the owner/creator of the message to control usage of the content by others. Conventional SIP-based messaging systems provide the ability to record live audio or video messages destined for users who are not currently available for interactive communications. However, the current systems cannot guarantee how the recipient of the message handles it. For instance, once a called party retrieves a stored message using email, that user could forward the message on to another email recipient, or could modify the original message. This behavior may not be in accord with the behavior intended by the original sender.

Using digital rights management (DRM) technology, the SSMS enhances both the calling party's and the called party's control over a message even after it has been forwarded to another user. Stored messages are encrypted and assigned usage rights by both the calling and called parties. The rights may specify users that may access or modify the content as well as how often and when the content may be accessed.

Figure 3:
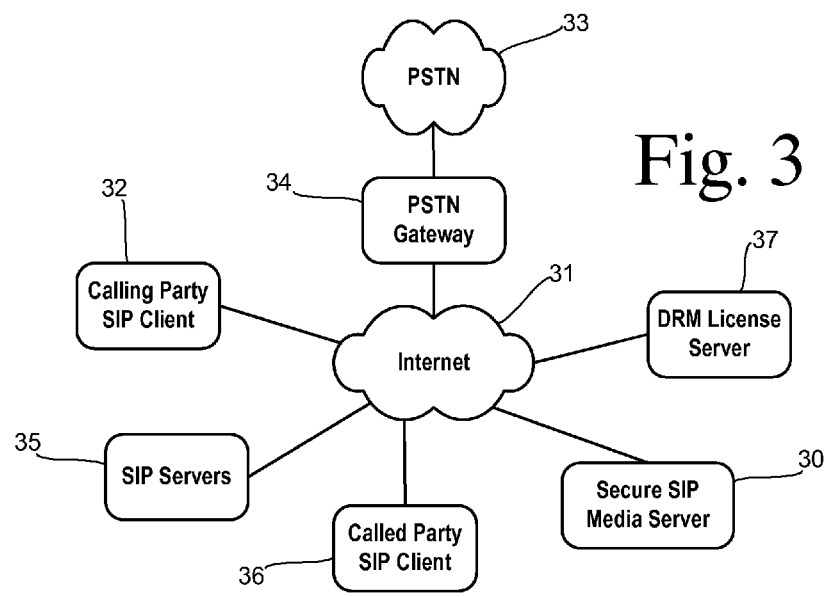
FIG. 3 is a block diagram showing an Internet architecture for a secure message recording and access system that may use the DRM negotiation of the present invention.

Referring to FIG. 3, a secure SIP media server 30 is coupled to an internetwork, such as the Internet 31, for providing a messaging service within an IP telephony system. IP telephony calls may be initiated to a desired, called party from a calling party within the internetwork using a SIP client 32 of a calling party, or may be initiated from a conventional telephone within PSTN 33 through a PSTN gateway 34 as is known in the art.

SIP servers 35 include a registrar/locator service as well as either a proxy server or a redirect server for setting up a network session between the calling party and either a called party SIP client 36 where the called party is available or secure SIP media server 30 for recording a message when the called party is unavailable.

The present invention applies digital rights management (DRM) techniques for the purpose of protecting a recorded message. Thus, a DRM license server 37 is coupled to Internet 31 for creating and distributing license files as is described below.

Figure 4:
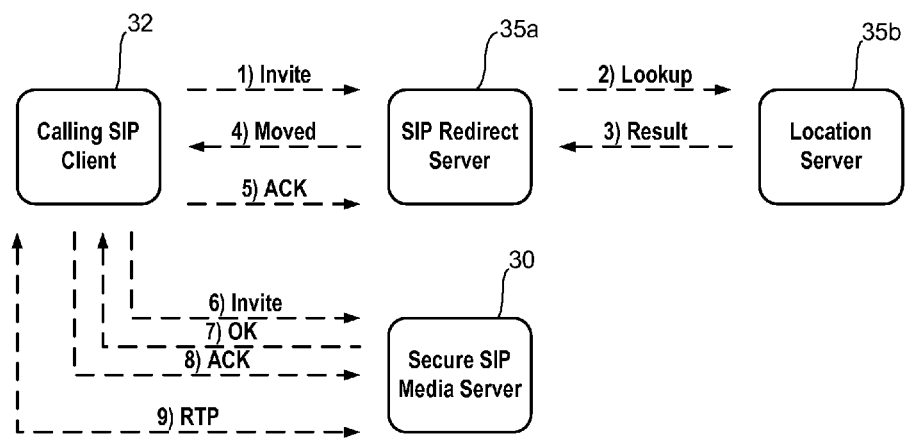
FIG. 4 is a block diagram showing message flow during the initiation of a network session between a calling party and the secure media server.

FIG. 4 illustrates message flow during the initiation of a network session between a calling party and the secure media server when the called party is unavailable (e.g., the called party has configured their IP telephony service such that they have an out-of-office status or the called party is already engaged in a call). As a first step, calling SIP client 32 sends an SIP Invite message to SIP redirect server 35a. The Invite message includes an address identifier of the called party, such as a telephone number or a user name and domain name (e.g., user1@sprint.com). In step 2, redirect server 35a sends an SIP Lookup message to an SIP location server 35b. Location server 35b consults its user database and provides an SIP Result message to redirect server 35a in step 3. The Result message includes an address (such as an IP address or a voice mail system user name and a domain name such as user1@vm.sprint.com) for directing the call attempt. In the present embodiment, location server 35b notifies redirect server 35a that the called party is unavailable but that they have a media mailbox that can be reached at the alternate address provided in the Result message.

In step 4, redirect server 35a sends a "temporarily moved" message to SIP client 32 and receipt of the message is acknowledged by SIP client 32 is step 5. Using the alternate address from the "temporarily moved" message, SIP client 32 sends an SIP Invite message to secure SIP media server 30 in step 6. SIP media server 30 recognizes the user specified by the address and sends an accept or "OK" message to SIP client 32 in step 7. SIP client 32 sends an acknowledgement message in step 8. In step 9, a real-time transport protocol (RTP) session is established between SIP client 32 and secure SIP media server 30 which persists during the recording of a message by the calling party. Other protocols could be used in the present invention, but RTP is currently the most widely accepted protocol for sessions of this type.

Figure 5:
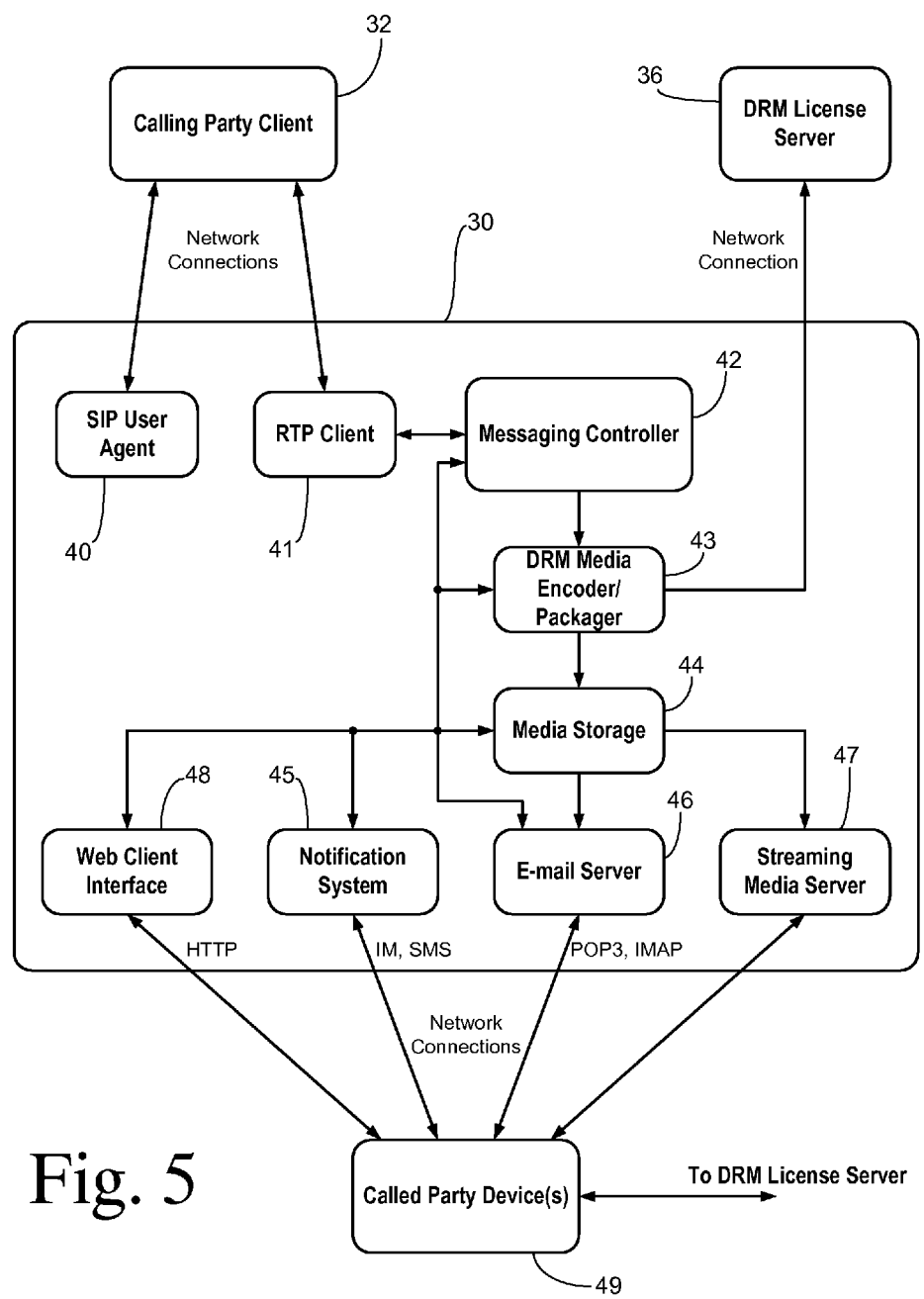
FIG. 5 is a block diagram showing the secure media server in greater detail.

FIG. 5 shows secure SIP media server 30 in greater detail. A SIP user agent 40 and an RTP client 41 establish/terminate SIP and RTP sessions, respectively, over the network with other clients such as calling party client 32. A messaging controller 42 handles DTMF control tones entered by the calling party and plays audio prompts and records audio and/or video messages within the RTP session established by RTP client 41. Messaging controller 42 is connected to most other components in secure SIP media server 30 for controlling its overall operation. Messaging controller 42 may include an intelligent voice response (IVR) unit, for example.

A DRM media encoder/packager 43 receives recorded messages or content from messaging controller 42 (e.g., in the form of a.wav file, a.wma file, or a.wmv file) and encrypts the recorded messages using an encryption key. The encryption key can be randomly generated from a key seed, for example. A unique identifier, such as a key identifier or a content identifier, is also generated to identify the encryption key that was used during the encryption. Depending upon the DRM system being used, DRM encoder/packager 43 may also apply the desired rights (i.e., usage rules) within the encrypted file itself. Preferably, the encrypted file may be decrypted using the same key as was used for encryption, but different keys may be used depending upon the type of encryption being employed. The encrypted message is packaged with the identifier to produce a protected message file, which is stored in a media storage 44.

DRM encoder/packager 43 communicates via the network with DRM license server 36. Default usage rights associated with messages recorded by the calling party may be stored within DRM license server 36, for example, and may be retrieved by DRM encoder/packager 43 during the encoding process. The encryption key and the corresponding identifier is transmitted from DRM encoder/packager 43 to DRM license server 36 to enable licenses to be subsequently issued (e.g., to the called party).

After the protected message file is available in media storage 44, a notification system 45 is activated by messaging controller 42 in order to send a notification message to a called party device 49. Notification system 45 is preconfigured to communicate via the network with called party device 49, which may comprise a networked computing device for receiving an instant message via an instant messaging (IM) service or a mobile telephone for receiving a text message via a short message service (SMS), for example. The notification message preferably contains a network hyperlink or other information for retrieving the protected message file.

After notification to the called party, a message can be retrieved using distribution components of secure SIP media server 30 including an e-mail server 46, a streaming media server 47, and a web client interface 48. E-mail server 46 is coupled to media storage 44 for creating an e-mail message for the called party having the protected message file as an e-mail attachment. The called party can log on to e-mail server 46 from device 49 in order to retrieve the e-mail and attachment. E-mail server 46 can also function as part of notification system 45 by sending a notification message via e-mail, wherein the e-mail message contains the network hyperlink for retrieving the protected message file.

Another embodiment for delivering a protected message file employs streaming media server 47 connected to media storage 44. Called party device 49, such as a personal computer, contacts streaming media server 47 using the network address hyperlink provided in the notification message to initiate streaming of the protected message file.

Yet another embodiment for delivering a protected message file employs web client interface 48 containing HTTP web pages for accessing the voice mail system. Called party device 49, such as a personal computer, browses web client interface 48 to locate web pages having links to protected message files corresponding to the currently stored messages. By activating a link, called party device 49 downloads the respective file (or a link to a streaming version of the file). Web client interface 48 may also include web pages for configuring a called party's voice mail box, for setting the called party's out-of-office status, and for other functions. Management of default rights for a calling party or a called party or the rights to be applied to a specific already recorded message can also be performed via web client interface 48, assuming that the person attempting to control such rights has proper authorization within the messaging system.

Called party device 49 communicates with DRM license server 46 via the network for obtaining a license (e.g., decryption key and usage rights) for accessing the protected message file, as will be described below.

Figure 6:
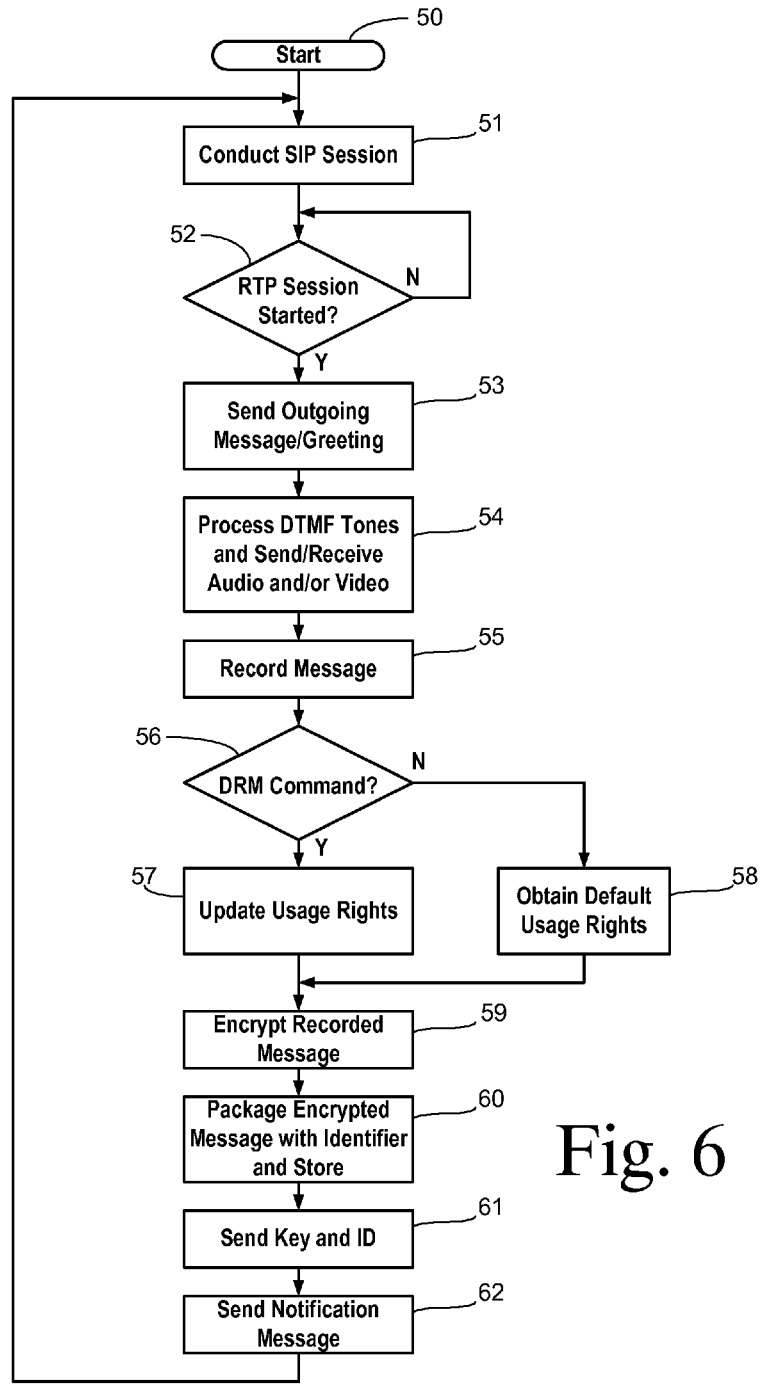
FIG. 6 is a flowchart showing one preferred embodiment of a method for recording and protecting a message.

FIG. 6 shows a preferred embodiment of a method performed by the secure SIP media server for recording a message starting at step 50. In step 51, an SIP session is conducted with a SIP client of a calling party. A check is made in step 52 for the initiation of an RTP session with the calling party. If not yet initiated, then continual rechecks are made. Once an RTP session is detected, the secure SIP media server sends an outgoing message or greeting to the calling party in step 53. The greeting may preferably include 1) a recording of the called party speaking their name and brief instructions, and 2) a menu of voice prompts from the IVR unit for assisting the calling party in leaving a recorded message or entering commands. In step 54, DTMF commands (e.g., initiated from a real or a software-generated telephone keypad) are processed and various audio and/or video content is sent and received. A message intended for the called party is recorded in step 55.

A check is made in step 56 to determine whether a digital rights command has been entered by the calling party (e.g., for specifying the desired usage rights to be associated with the recorded message). If yes, then the usage rights to be applied are gathered from the calling party and the usage rights assigned to the recorded message are updated in step 57. If no DRM command is detected in step 56 then default usage rights are obtained in step 58 (e.g., by looking up the default usage rights corresponding to the calling party and/or the called party, as stored by the DRM license server).

The recorded message is encrypted in step 59 and then packaged with the key identifier and stored in step 60. The key identifier and the encryption/decryption key are sent to the DRM license server in step 61. Lastly, a notification message is sent to the called party in step 62.

Figure 7:
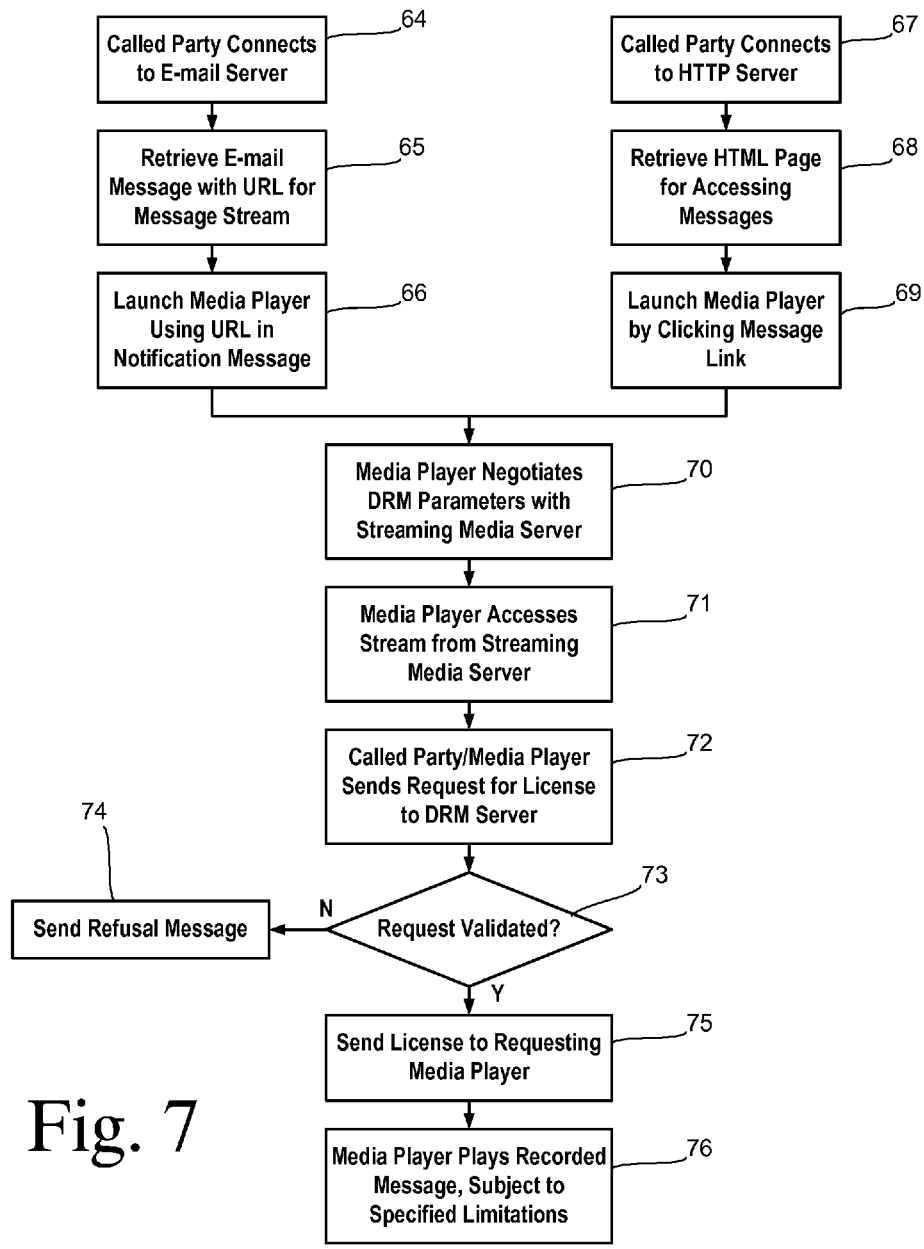
FIG. 7 is a flowchart showing preferred embodiments of a method for a called party to retrieve a protected message.

Two alternative methods for retrieving a message are shown in FIG. 7. The called party connects to the SSMS e-mail server in step 64 (e.g., in response to an instant message that a message is present in the called party's e-mail in-box). In step 65, the e-mail message is retrieved by logging on to the e-mail server. The protected message file may be included as an e-mail attachment, or the e-mail message may include a uniform resource locator (URL) address for obtaining the protected message file as a stream from the streaming media server, for example. In step 66, the called party opens the protected message file, e.g., by opening the downloaded file attachment or accessing the URL given in the notification message or e-mail message. In either case, the opening of the file automatically launches a media player on the called party's computing device for playing the protected message file.

In an alternative method, the called party connects to the SSMS web client interface in step 67 (e.g., in response to an instant message). In step 68, a web browser running on the called party's computing device navigates to an HTML page for accessing pending messages. The address or URL of the page is preferably preconfigured in the web browser. Each pending message is preferably shown on the HTML web page as a link to either a downloadable file or as a streaming copy of the protected message file. In step 69, the called party opens the protected message file, e.g., by opening the downloaded file or clicking the URL in the message link on the web page. In either case, the opening of the file automatically launches a media player on the called party's computing device for playing the protected message file.

After the media player is launched, it negotiates DRM parameters (such as DRM type) with the streaming media server in step 70 so that a DRM method supported by both the media player and the media server is identified. In step 71, the media player accesses the streamed protected message file from the streaming media server. The packaged file in the stream includes the identifier (e.g., key identifier) that needs to be given to the DRM license server so that the necessary decryption key can be identified. For example, the streamed file may include a file header containing the key identifier. In step 72, the media player of the called party sends a request for a license to the DRM license server. The request includes the key identifier so that it can identify the target message and the requirements for obtaining a license (e.g., the identity of the called party). In response to the request, a challenge-response process is initiated for validating the request. For example, the called party may be required to provide a user name and password to the DRM license server in order to validate the request. Any known type of authentication and authorization may also be used in validating a request.

A check is made in step 73 to determine whether the request is validated. If not, then a refusal message is sent in step 74 and the media player fails to reproduce the message. If the request is validated, then the DRM license server sends a license to the requesting media player in step 75. The license includes the decryption key and the specified usage rights (e.g., limitations as to how many times the message can be played or whether or not forwarding or modification of a message is allowed). In step 76, the media player decrypts and plays the recorded message subject to the limitations specified by the usage rights.

In one preferred embodiment, Microsoft Windows Media 9 Series digital rights management applications, tools, and specifications are used, although any DRM system can be used in the present invention. Files may be encrypted using Windows Media Rights Manager and played back using Windows Media Player version 9. The DRM license server preferably uses the Windows Media License Service.

Figure 8:
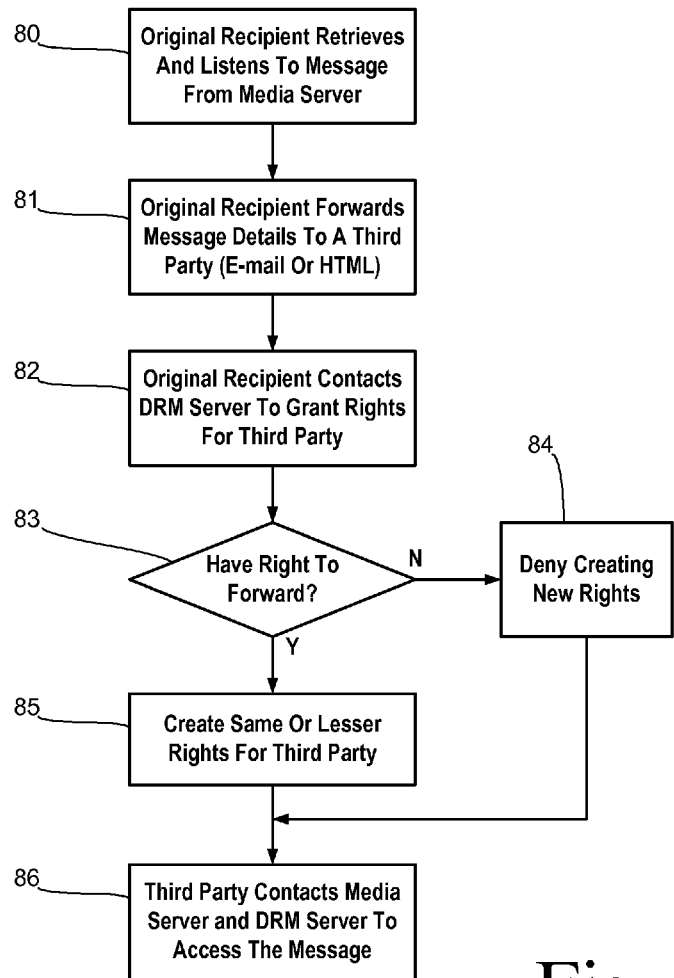
FIG. 8 is a flowchart showing a preferred method of forwarding protected messages.

Protected messages can be shared by the recipient with third parties using the method shown in FIG. 8, for example. In step 80, the original message recipient retrieves and listens to a message from the secure SIP media server. In order to share the message, the original recipient forwards message details to the third party (e.g., via an e-mail or by creating an HTML web page to be accessed by the third party). Alternatively, the protected message file itself could be sent to the third party. In step 82, the original recipient authenticates with the DRM server in order to arrange for rights to be recognized for the third party.

In step 83, the DRM server checks whether the original recipient has sufficient rights to forward the message to the third party. If the original recipient does not have such rights, then the request to create new rights is denied in step 84. Otherwise, the original recipient creates rights for the third party in step 85. The newly created rights can be same as or lesser than the rights possessed by the original recipient (i.e., no greater than the rights originally given out by the party that created the message). In step 86, the third party contacts the media server (in the embodiment where the third party is given a URL for accessing the streaming file) and the DRM server in order to access the message. If no rights were created for the third party or if the third party does not successfully authenticate with the DRM server, then no license will be provided and the third party will not be able to access the protected message.

Figure 9:
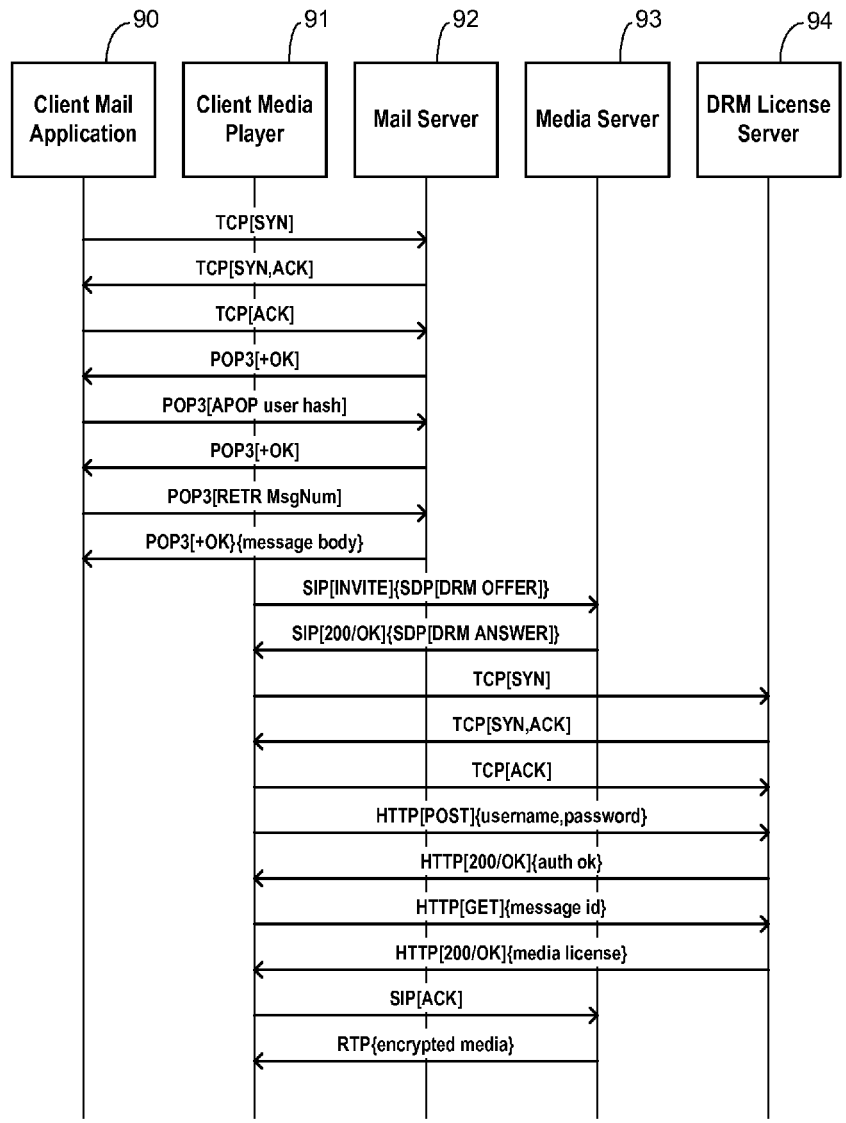
FIG. 9 shows an IP message sequence involved when the original recipient or a third party accesses a protected message via e-mail.

FIG. 9 shows an IP message sequence involved when either the original recipient or a third party accesses a protected message via e-mail, i.e., when the recipient is informed of a URL for accessing the protected message within a streaming media server. The interacting components include a client mail application 90, a client media player 91, a mail server 92, a streaming media server 93, and a DRM license server 94. The client retrieves an e-mail message that contains a SIP URL for accessing the recorded media message as follows:

Client mail application 90 establishes a TCP connection to mail server 92 using standard mail protocols (POP3 for example).
   Mail server 92 sends a greeting.
   Client mail application 90 sends authentication credentials (e.g., user hash).
   Mail server 92 acknowledges successful authentication.
   Client mail application 90 sends a message retrieval command.
   Mail server 92 sends the e-mail message containing the SIP URL for the recorded voicemail message.

In the next phase of retrieval, client media player 91 negotiates with media server 93 to determine the type of DRM protection that must be used to access and operate on the recorded media as follows:

Client media player 91 sends a SIP INVITE to media server 93 containing a DRM OFFER primitive (using SDP for formatting). The SIP address used for the INVITE is extracted from the e-mail message previously downloaded, and contains a unique identifier for the message to be played as well as the username for the mailbox that the message is stored in. An sample format for the SIP address is: username.messageid@mediaserver.com.
   Media server 93 acknowledges the INVITE by sending a 200/OK that contains a DRM ANSWER primitive. Client media player 91 delays sending the SIP ACK until completion of DRM license retrieval for the media. If client media player 91 does not send the authentication credentials in the INVITE, media server 93 must send a 407/Authentication Required to force authentication.

Client media player 91 then retrieves a license for the recorded media using the DRM protocol above as follows:

Client media player 91 establishes a TCP connection to license server 94 using the negotiated protocol (e.g., HTTP).
   Client media player 91 sends a HTTP/POST containing its authentication credentials.
   License server 94 acknowledges the successful authentication of the client.
   Client media player 91 sends an HTTP/GET to retrieve the license for the "messageid" extracted from previous e-mail message.
   License server 94 sends the license to be used for accessing the recorded message media.

In the next phase of the retrieval, client media player 91 completes the SIP transaction and begins receiving the recorded media as follows:

Client media player 91 sends the SIP ACK, completing the session initiation transaction with the media server. The media server is now free to begin sending the recorded media.
   Media server 92 begins transmitting the encrypted recorded message. Client media player 91 uses the retrieved license to decrypt the media and operate on it using the methods permitted by the license.

Figure 10:
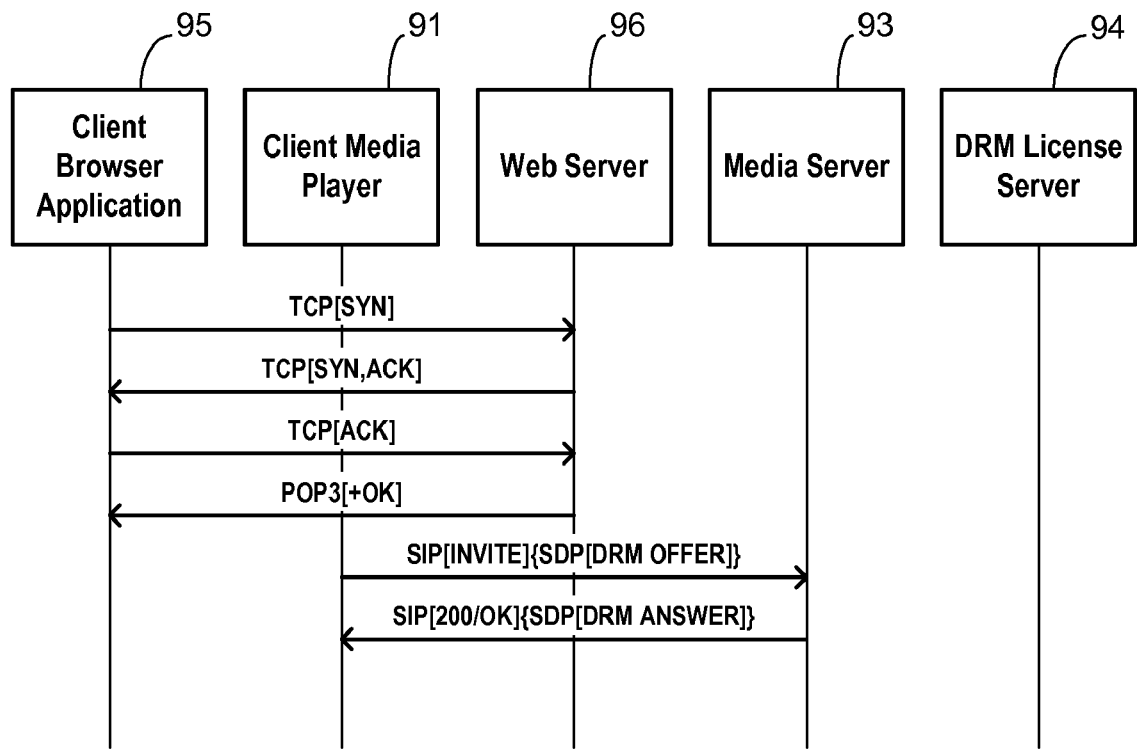
FIG. 10 shows a portion of an IP message sequence involved when the original recipient or a third party accesses a protected message via an HTML web page.

FIG. 10 shows a modified method wherein the SIP URL is obtained via an HTML web page (e.g., a web page included in a browsable interface to a voice mail system). For this retrieval, the components include a client browser application 95, client media player 91, web server 96, media server 93, and DRM license server 94. Thus, client browser application 95 establishes a TCP connection to web server 96. Application 95 then sends an HTTP/GET message to retrieve the HTML page. Web server 96 sends an HTTP 200/OK response with the HTML page containing a SIP URL for accessing the recorded media. Once the user selects a link to the SIP URL, subsequent operation is as shown in the last half of FIG. 9.

What is claimed is:

1. A method for serving digital rights management (DRM) encoded content item from a target server to a digital network in accordance with a plurality of DRM methods, said target server being capable of providing said DRM encoded content item in a plurality of respective DRM methods, said target server including a plurality of ports wherein each port serves said DRM encoded content item using a respective DRM method, said method comprising the steps of:

establishing a link on said target server for accessing said DRM encoded content item;
   establishing a network session between said target server and a client accessing said link;
   said target server receiving an offer message from said client containing a list of at least one supported DRM method;
   said target server sending an answer message to said client containing a corresponding answer list 1) indicating whether each DRM method listed in said offer message is one of said plurality of respective DRM methods supported by said target server, 2) providing a respective network address of a DRM license server for each supported DRM method, and 3) indicating a port of said target server for accessing said DRM encoded content item for each supported DRM method, respectively; and
   said target server receiving a request message from said client and delivering said DRM encoded content item to said client using said DRM method corresponding to a port identified in said request message, whereby said target server delivers said DRM encoded content item according to a respective DRM method selected by said client.

2. The method of claim 1 wherein said offer message and said answer message further indicate supported transport methods for delivering said DRM encoded content item.

3. The method of claim 1 wherein said answer message contains an explicit response to each DRM method listed in said offer message.

4. The method of claim 3 wherein said explicit response corresponding to a DRM method not supported by said target server is comprised of a zero value.

5. The method of claim 1 wherein said offer message and said answer message are exchanged using a session description protocol.

6. A non-transitory computer readable medium encoded with software for operating a computer system for distribution of digital rights management (DRM) encoded content items over a digital network between clients and a target server in accordance with a plurality of DRM methods, said target server being capable of providing said DRM encoded content item in a plurality of respective DRM methods, said target server including a plurality of ports wherein each port serves said DRM encoded content item using a respective DRM method, wherein when executed by said target server, said software is operable to perform the steps comprising:

establishing a link on said target server for accessing said DRM encoded content item;

establishing a network session between said target server and a client accessing said link;

receiving an offer message from said client containing a list of at least one supported DRM method;

sending an answer message to said client containing a corresponding answer list 1) indicating whether each DRM method listed in said offer message is one of said plurality of respective DRM methods supported by said target server, 2) providing a respective network address of a DRM license server for each supported DRM method, and 3) indicating a port of said target server for accessing said DRM encoded content item for each supported DRM method, respectively; and receiving a request message from said client and delivering said DRM encoded content item to said client using said DRM method corresponding to a port identified in said request message, whereby said target server delivers said DRM encoded content item according to a respective DRM method selected by said client.

7. The software of claim 6 further operable to indicate supported transport methods for delivering said DRM encoded content item.

8. The software of claim 6 further operable to provide an explicit response to each DRM method listed in said offer message.

9. The software of claim 8 wherein said explicit response corresponding to a DRM method not supported by said target server is comprised of a zero value.

10. The software of claim 6 wherein said offer message and said answer message are exchanged using a session description protocol.

* * * * *